United States Patent Office 3,686,109
Patented Aug. 22, 1972

3,686,109
AQUEOUS FORMULATION OF WATER SOLUBLE CATIONIC OR ANIONIC VINYL ADDITION POLYMERS WITH WATER SOLUBLE CONDENSATION POLYAMIDES
Paul H. Aldrich, Wilmington, Del., Don G. Bartell, Richmond, Va., and Herbert H. Espy, Wilmington, Del., assignors to Hercules Incorporated, Wilmington, Del.
No Drawing. Filed Sept. 24, 1970, Ser. No. 75,260
Int. Cl. C08f 45/24
U.S. Cl. 260—29.6 NR          5 Claims

ABSTRACT OF THE DISCLOSURE

The invention relates to aqueous formulations and process of preparing. The formulations are stable and readily dilutable with water. These formulations include high molecular weight water-soluble cationic or anionic vinyl addition polymers in admixture with certain water-soluble condensation polymers and water, the condensation polymers being polyamides or polyureylenes. The viscosities of the formulations are surprisingly less than the viscosities of binary formulations with the same proportions of vinyl addition polymers and water. Two processes of preparing these formulations are described.

The invention relates to aqueous formulations and process of preparing. The formulations are stable and readily dilutable with water. These formulations include high molecular weight water soluble cationic or anionic vinyl addition polymers in admixture with certain water soluble condensation polymers and water, the condensation polymers being described in claim 1. The viscosities of the formulations are surprisingly less than the viscosities of binary formulations with the same properties of vinyl addition polymers and water. Two processes of preparing these formulations are described in claims 8 and 9.

The present invention relates to aqueous polymeric formulations and process of preparing, which formulations are stable and readily dilutable with water, comprising high molecular weight water soluble cationic or anionic vinyl addition polymers, certain water soluble condensation polymers and water, the viscosity of the formulations being substantially less than the viscosity of bicomponent formulations with the same proportions of the same vinyl addition polymers and water The vinyl addition polymers hereof form with water either solutions or dispersions whereas the condensation polymers form solutions. The final formulations of this invention may be either solutions or dispersions.

Many uses for water soluble polymers require polymers having molecular weights in the range of about 250,000 to several million, more often about 1,000,000 to 20,000,000. Solutions and dispersions containing the desired concentrations suitable for storage and shipment to end-use locations of these high molecular weight water soluble vinyl addition polymers are extremely difficult to prepare and process and with some even solutions as dilute as about 2% are too viscous to pump or readily dilute to the end-use concentrations required. Usually, these difficulties are even greater when said vinyl addition polymers are cationic than when they are anionic. Many uses for these polymers, such as e.g. for flocculating agents and corrosion inhibitors, require very dilute aqueous solutions of the high molecular weight vinyl addition polymers, such as e.g. 0.5%–0.01%. On the other hand it is economically desirable to ship and store aqueous solutions or dispersions with as little water as possible, but they must also be stable and easily dilutable to end-use concentrations at the place of use.

Known methods for decreasing or suppressing the viscosity of high molecular weight water soluble vinyl addition polymers applicable herein have undesirable characteristics. Two such methods are addition to the vinyl addition polymers of certain inorganic salts and the addition of poor solvents or nonsolvents. One disadvantage of using inorganic salts is that they often cause scale buildup, promote corrosion or have other undesirable effects in end-use application. Poor solvents and nonsolvents are usually flammable or volatile, and their use is costly.

In accordance with the present invention it has been found that the addition of high molecular weight water soluble cationic or anionic vinyl addition polymers to aqueous solutions or dispersions of certain condensation polymers gives formulations having viscosities substantially less than that of bicomponent formulations with the same proportions of the same vinyl addition polymers and water.

Processes of preparing the formulations of this invention is important. When the vinyl addition polymer is initially available in the form of a solid of discrete particles, as is the case with most such polymers, by far the most practical method is by adding the solid vinyl addition polymer to a concentrated aqueous solution of the condensation polymer with agitation to form a uniform paste and then diluting the paste with water to the desired concentration for shipping or storing.

The concentration of the aqueous solution of condensation polymers to which the vinyl addition polymers are added in preparing the paste can vary widely. The minimum concentration is just above that at which difficulty is apt to be encountered in dispersing and dissolving the vinyl addition polymers, and this varies with the particular vinyl addition polymer involved. The maximum concentration is that at which the condensation polymers can be prepared readily in liquid form, and this varies with the particular condensation polymer involved. Thus the concentration (in parts per 100 parts water by weight) of the aqueous solution of the condensation polymers to which the vinyl addition polymers are added in preparing the paste will be at least about 20 e.g. about 20–200 and more often about 25–100 and occasionally the concentration can fall outside these ranges.

When the vinyl addition polymer is initially available in the form of a gum-like mass, as is the case with a few of such polymers, by far the most practical method is by adding the vinyl addition polymer in its "gummy" state to an aqueous solution of the condensation polymer which already contains enough water to give a final formulation having the desired concentration for shipping or storing, said concentrations being discussed hereinafter.

With the formulations of the present invention the vinyl addition polymers are readily placed in solution or dispersion, the formulations are readily dilutable to the end-use concentrations desired, and the formulations are stable.

The following examples illustrate specific embodiments of the present invention. These examples are not intended to limit the present invention to any greater extent than do the appended claims. In the examples and elsewhere herein percent and parts are by weight unless otherwise given. The paste method described above was used in carrying out the examples of Tables 1, 2 and 4 hereinafter. The "gum" method described above was used in carrying out the examples of Table 3 hereinafter. In the next to the last column in the tables, the concentration at which the viscosity was measured was the same as the concentration of the vinyl addition polymer used in the mixture (i.e. in Example 1, the 33,700 viscosity was measured on a solution of 4 parts of the vinyl addition polymer in 100 parts water by weight).

Further details appear in Tables 1–4 hereinafter.

In each of the following examples the vinyl addition polymer was easier to initially dissolve (i.e. it dissolved faster and with less agitation) in water in the presence of the condensation polymer (i.e. in making the vinyl addition polymer-condensation polymer formulations of this invention) than in the absence of the condensation polymer (i.e. in the prior art). The same contrast was also experienced in diluting to end-use concentration, i.e. the vinyl addition polymer-condensation polymer formulations of this invention diluted faster and with less agitation than did the prior art vinyl addition polymer concentrates.

TABLE 1.—83% ACRYLAMIDE-17% MTMMS [a] CATIONIC VINYL ADDITION COPOLYMER WITH VARIOUS CONDENSATION POLYMERS

| Ex. No. | High molecular weight vinyl addition polymer 1% viscosity cps.[b] | Condensation polymer Name | Conc.[c] | Viscosity, cps.[b] addition polymer | Vinyl addition polymer-condensation polymer mixture |
|---|---|---|---|---|---|
| 1 | 315 | 4 (d) | 6 | 33,700 | 15,000 |
| 2 | 315 | 4 (d) | 8 | 33,700 | 12,200 |
| 3 | 315 | 5 (d) | 7.5 | >80,000 | 18,200 |
| 4 | 315 | 3 (d) | 6 | 11,300 | 7,300 |
| 5 | 315 | 3.6 (d) | 3.4 | 22,000 | 12,400 |
| 6 | 315 | 3.8 (d) | 3.7 | 23,000 | 17,300 |
| 7 | 315 | 4 (d) | 7 | 33,700 | 14,000 |
| 8 | 315 | 4 (d) | 3.9 | 33,700 | 19,000 |
| 9 | 315 | 4 (d) | 2 | 33,700 | 23,100 |
| 10 | 315 | 3.12 (d) | 1.04 | 16,800 | 12,800 |
| 11 | 315 | 4 (e) | 6 | 33,700 | 16,600 |
| 12 | 315 | 3 (e) | 12 | 11,000 | 6,480 |
| 13 | 315 | 4 (f) | 6 | 33,700 | 17,600 |
| 14 | 315 | 6.8 (g) | 31 | >100,000 | 28,600 |
| 15 | 315 | 8.3 (g) | 37.5 | >100,000 | 35,000 |
| 16 | 315 | 3.7 (h) | 5.6 | 26,600 | 21,100 |
| 17 | 315 | 3.7 (h) | 11.6 | 26,600 | 8,800 |
| 18 | 315 | 3.7 (i) | 5.6 | 26,600 | 24,000 |
| 19 | 315 | 3.7 (i) | 11.6 | 26,600 | 14,200 |
| 20 | 315 | 3.7 (j) | 5.6 | 26,600 | 24,100 |
| 21 | 315 | 3.7 (k) | 5.6 | 26,600 | 23,800 |
| 22 | 315 | 3.7 (k) | 11.6 | 26,600 | 19,400 |

[a] MTMMS is β-methacryloyloxyethyltrimethylammonium methyl sulfate.
[b] Using standard Brookfield Synchro-Lectric LVF viscometer at 30 r.p.m. and 25° C.
[c] Parts per 100 parts water by weight.
[d] Polyamide containing quaternary ammonium groups obtained by reacting adipic acid with diethylenetriamine in 1:1 molar ratio, subsequently alkylating with formaldehyde and formic acid, and then reacting with epichlorohydrin to convert a majority of the secondary amine groups to quaternary ammonium groups.
[e] Polyamide containing tertiary amine groups and quaternary ammonium groups obtained by reacting adipic acid with diethylenetriamine in 1:1 molar ratio, subsequently reacting with epichlorohydrin to convert a majority of the secondary amine groups to tertiary amine groups and quaternary ammonium groups (including cyclic structures).
[f] Polyamide containing secondary amine groups obtained by reacting adipic acid with diethylenetriamine in 1:1 molar ratio.
[g] Polyureylene containing quaternary ammonium groups obtained by reacting urea with N,N-bis(3-aminopropyl)-methylamine in 1:1 molar ratio, subsequently reacting with dimethyl sulfate to convert a majority of the tertiary amine groups to quaternary ammonium groups.
[h] Polyamide containing tertiary amine groups obtained by reacting adipic acid with tetraethylenepentamine in 1:1 molar ratio, subsequently reacting with acrylamide to convert a majority of the secondary amine groups to tertiary amine groups.
[i] Polyamide containing quaternary ammonium groups obtained by reacting adipic acid with N,N-bis-(3-aminopropyl)methylamine in 1:1 molar ratio, subsequently reacting with dimethyl sulfate to convert a majority of the tertiary amine groups to quaternary ammonium groups.
[j] Polyureylene containing tertiary amine groups obtained by reacting urea with N,N-bis(3-aminopropyl)-methylamine in 1:1 molar ratio.
[k] Polyureylene containing quaternary ammonium groups obtained by reacting urea with N,N-bis(aminopropyl)-methylamine in 1:1 molar ratio, subsequently reacting with epichlorohydrin to convert a majority of the tertiary amine groups to quaternary ammonium groups.

TABLE 2.—VARIOUS CATIONIC VINYL ADDITION CO- AND TERPOLYMERS WITH A PARTICULAR CONDENSATION POLYMER

| Ex. No. | Name | 1% viscosity cps.[a] | Conc.[b] | Condensation Polymer Name | Conc.[b] | Viscosity, cps.[a] Vinyl addition Polymer | Vinyl addition Polymer-condensation Polymer Mixture |
|---|---|---|---|---|---|---|---|
| 23 | 94% acrylamide-6% MTMMS [c] copolymer | 175 | 4 | (d) | 6 | 30,000 | 16,000 |
| 24 | 85% acrylamide-15% MTMCl[e] copolymer | 120 | 4 | (d) | 6 | 22,600 | 19,200 |
| 25 | 85% methacrylamide-15% MTMMS copolymer | 540 | 7.4 | (d) | 11.3 | 10,800 | 9,000 |
| 26 | 85% acrylamide-15% methylvinylpyridine copolymer | 55 | 11.1 | (d) | 16.7 | 20,400 | 1,200 |
| 27 | 66% acrylamide-16% MDMA [f]-18% MTMCl terpolymer | 1,250 | 4.5 | (d) | 6.7 | 19,000 | 7,600 |

[a] Using standard Brookfield Synchro-Lectric LVF viscometer at 30 r.p.m. and 25° C.
[b] Part per 100 parts water by weight.
[c] MTMMS is β-methacryloyloxyethyltrimethylammonium methyl sulfate.
[d] Polyamide containing quaternary ammonium groups obtained by reacting adipic acid with diethylenetriamine in 1:1 molar ratio, subsequently alkylating with formaldehyde and formic acid, and then reacting with epichlorohydrin to convert a majority of the secondary amine groups to quaternary ammonium groups.
[e] MTMCl is β-methacryloyloxyethyltrimethylammonium chloride.
[f] MDMA is β-methacryloyloxyethyldimethylamine.

TABLE 3.—VARIOUS CATIONIC VINYL ADDITION HOMOPOLYMERS WITH VARIOUS CONDENSATION POLYMERS

| Ex. No. | High molecular weight vinyl addition polymer | | Condensation polymer | | Viscosity, cps.[a] | | |
|---|---|---|---|---|---|---|---|
| | Name | 1% viscosity cps.[a] | Conc.[b] | Name | Conc.[b] | Vinyl addition polymer | Vinyl addition polymer-condensation polymer mixture |
| 28 | Poly (MTMMS) [c] | 355 | 15 | [d] | 3 | 30,800 | 17,200 |
| 29 | do | 355 | 15 | [d] | 1.2 | 38,000 | 18,000 |
| 30 | do | 355 | 15 | [e] | 3 | 30,800 | 23,800 |
| 31 | do | 355 | 15 | [f] | 4 | 30,800 | 16,000 |
| 32 | do | 355 | 21 | [g] | 18 | 28,400 | 7,200 |
| 33 | Poly (DMVPMS) [h] | 260 | 5 | [e] | 5 | 15,800 | 14,000 |

[a] Using standard Brookfield Synchro-Lectric LVF viscometer at 30 r.p.m. and 25° C.
[b] Parts per 100 parts water by weight.
[c] MTMMS is β-methacryloyloxyethyltrimethylammonium methyl sulfate.
[d] Polyamide containing quaternary ammonium groups obtained by reacting adipic acid with diethylenetriamine in 1:1 molar ratio, subsequently alkylating with formaldehyde and formic acid, and then reacting with epichlorohydrin to convert a majority of the secondary amine groups to quaternary ammonium groups.
[e] Polyamide containing secondary amine groups obtained by reacting adipic acid with diethylenetriamine in 1:1 molar ratio.
[f] Polyamide containing tertiary amine groups and quaternary ammonium groups obtained by reacting adipic acid with diethylenetriamine in 1:1 molar ratio, subsequently reacting with epichlorohydrin to convert a majority of the secondary amine groups to tertiary amine groups and quaternary ammonium groups (including cyclic structures).
[g] Polyamide containing tertiary amine groups obtained by reacting adipic acid with tetraethylenepentamine in 1:1 molar ratio, subsequently reacting with acrylamide to convert a majority of the secondary amine groups to tertiary amine groups and then reacting with glyoxal.
[h] DMVPMS is 1,2-dimethyl-5-vinylpyridinium methyl sulfate.

TABLE 4.—VARIOUS ANIONIC VINYL ADDITION COPOLYMERS WITH A PARTICULAR CONDENSATION POLYMER

| Ex. No. | High molecular weight vinyl addition polymer | | Condensation polymer | | Viscosity, cps.[a] | | |
|---|---|---|---|---|---|---|---|
| | Name | 1 percent viscosity cps.[a] | Conc.[b] | Name | Conc.[b] | Vinyl addition polymer | Vinyl addition polymer-condensation polymer mixture |
| 34 | 90% acrylamide-10% sodium acrylate copolymer | 190 | 4 | [c] | 6 | 18,000 | 6,400 |
| 35 | do | 190 | 5 | [c] | 5 | 40,000 | 27,000 |
| 36 | 62% methacrylamide-38% sodium acrylate copolymer | 750 | 3 | [c] | 5 | 8,800 | 6,000 |
| 37 | 90% acrylamide-10% sodium sulfopropylacrylate copolymer | 660 | 6.4 | [c] | 2.5 | 8,600 | 5,800 |

[a] Using standard Brookfield Synchro-Lectric LVF viscometer at 30 r.p.m. and 25° C.
[b] Parts per 100 parts water by weight.
[c] Polyamide containing secondary amine groups obtained by reacting adipic acid with diethylenetriamine in 1:1 molar ratio.

In all of the foregoing examples the vinyl addition polymer-condensation polymer formulations of this invention were stable for a sufficient period of time to meet any practical needs. Some were measured for stability after 8 months and some after 4 weeks and all were found to be stable. By stable is meant the vinyl addition polymer-condensation polymer formulations showed no substantial viscosity change (experimentally measured), and that they showed no evidence of phase separation, precipitation of material, nor change in color (visually observed) after storage at atmospheric conditions. Stability is needed for a sufficient time to enable shipment and/or storage of the formulations between the time of preparation and end use. For instance in Example 1 of Table 1 hereinbefore the viscosity of the vinyl addition polymer-condensation polymer formulation was found to have undergone only a slight decrease in viscosity after 12 days and only a very slight further decrease in viscosity after 8 months, as follows: initial viscosity 15,000; 12 days viscosity 14,000; 8 months viscosity 13,680, viscosity being measured as in the examples hereinbefore; in addition after these periods of storage the formulation showed no evidence of phase separation, precipitation of material, nor change in color.

High molecular weight water soluble vinyl addition polymers applicable herein include:

(1) Vinyl homopolymers containing quaternary ammonium groups.

(2) Vinyl polymers containing both quaternary ammonium groups and tertiary amine groups.

(3) Copolymers of vinyl monomers containing quaternary ammonium groups and up to about 95% by weight of the total of another vinyl monomer.

(4) Terpolymers of vinyl monomers containing quaternary ammonium groups and up to about 95% by weight of the total of two other vinyl monomers.

(5) Vinyl homopolymers containing carboxylic acid groups, sulfonic acid groups, or water soluble salts of each.

(6) Copolymers of vinyl monomers containing carboxylic acid groups, sulfonic acid groups, or the water soluble salts of each, and up to about 95% by weight of the total of another vinyl monomer.

In (1) above a vinyl monomer containing a quaternary ammonium group is homopolymerized.

In (2) above a vinyl polymer is prepared either (a) by copolymerizing a vinyl monomer containing a quaternary ammonium group and a vinyl monomer containing a tertiary amine group, or (b) by polymerizing a vinyl monomer containing a tertiary amine group and then quaternizing the resulting polymer.

In (3) above a vinyl monomer containing a quaternary ammonium group is copolymerized with one other vinyl monomer.

In (4) above a vinyl monomer containing a quaternary ammonium group is terpolymerized with two other vinyl monomers.

In (5) above a vinyl monomer containing a carboxylic acid group, sulfonic acid group, or the water soluble salt of each is homopolymerized.

In (6) above a vinyl monomer containing a carboxylic acid group, sulfonic acid groups, or the water soluble salt of each is copolymerized with one other vinyl monomer. Copolymers containing carboxyl functionality (as in (6(A)), column 9, hereinafter) may alternatively be prepared by partial hydrolysis of a homopolymer of acrylamide or substituted acrylamide. For example a copolymer of acrylamide and sodium acrylate may be prepared by partial hydrolysis of poly(acrylamide) in the presence of aqueous sodium hydroxide. The extent of hydrolysis is not critical, and any is applicable herein. Of course complete hydrolysis would give the homopolymer, i.e. poly(sodium acrylate).

Acrylamide and substituted acrylamides (i.e. substituted on the alpha carbon atom or on the nitrogen atom) are among the other monomers in (3), (4) and (6) above which give copolymers and terpolymers particularly useful in the present invention. Said acrylamide and substituted acrylamides include compounds having the formula

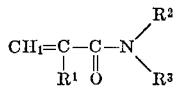

wherein $R^1$, $R^2$ and $R^3$ are each hydrogen or lower alkyl (e.g. of 1–4 carbon atoms), specific examples of which include acrylamide, methacrylamide, N-isopropyl acrylamide.

The esters of acrylic acid and substituted acrylic acids applicable herein include e.g. compounds having the formula

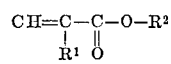

wherein $R^1$ is hydrogen or lower alkyl (e.g. of 1–4 carbon atoms) and $R^2$ is lower alkyl (e.g. of 1–4 carbon atoms).

The following are typical examples of the polymers in (1) above:

(A) Homopolymers of acrylate and methacrylate alkyl esters containing quaternary ammonium groups particularly those of 2–4 carbon atoms in the alkylene group, e.g. poly($\beta$-acryloyloxy-n-butyldiethylmethylammonium methyl sulfate); poly($\beta$-methacryloyloxyethyldimethylbenzylammonium chloride).

(1) Homopolymers of acrylate and methacrylate ethyl esters containing quaternary ammonium groups having 3 alkyl substituents of 1 or 2 carbon atoms, e.g. poly(acryloyloxyethyltrimethylammonium methyl sulfate); poly($\beta$-methacryloyloxyethyltrimethylammonium methyl sulfate); poly($\beta$-methacryloyloxyethyldiethylmethylammonium methyl sulfate); poly($\beta$-methacryloyloxyethyldimethylethylammonium chloride).

(B) Homopolymers of a vinyl quaternary pyridinium salt wherein the pyridinium ring contains 0–2 alkyl substituents of 1 or 2 carbon atoms attached to carbon atoms in the pyridinium ring in addition to the vinyl group and the substituent on the nitrogen, e.g. poly(1-benzyl-2-methyl-5-vinylpyridinium chloride); poly(1-hydroxyethyl-4-vinylpyridinium bromide).

(1) Homopolymers of a vinyl quaternary pyridinium salt wherein the pyridinium ring contains 1–3 alkyl substituents of 1 or 2 carbon atoms, e.g. poly(1,2-dimethyl-5-vinylpyridinium methyl sulfate); poly(1,2-dimethyl-5-vinylpyridinium chloride).

(C) Homopolymers of quaternary diallylammonium salts, e.g. poly(benzylmethyldiallylammonium chloride); poly(hydroxyethylethyldiallylammonium bromide).

(1) Homopolymers of quaternary diallyldialkylammonium salts wherein the 2 alkyl groups contain 1 or 2 carbon atoms, e.g. poly(dimethyldiallylammonium methyl sulfate); poly(methylethyldiallylammonium bromide).

(D) Homopolymers of ethyl vinyl ethers having quaternary ammonium groups in the beta position on the ethyl group, e.g. poly(2-ethyldiethylbenzylammonium chloride vinyl ether); poly(2-ethyltriethylammonium ethyl sulfate vinyl ether).

(1) Homopolymers of ethyl vinyl ethers having quaternary ammonium groups in the beta position on the ethyl group, the quaternary ammonium groups having 3 substituents of 1 or 2 carbon atoms, e.g. poly(2-ethyltrimethylammonium methyl sulfate vinyl ether).

The following are typical examples of polymers in (2) above:

$\beta$-methacryloyloxyethyldimethylamine and
$\beta$-methacryloyloxyethyltrimethylammonium methyl sulfate copolymer
2-vinylpyridine and
1-benzyl-2-methyl-5-vinylpyridinium chloride copolymer
poly($\beta$-dimethylaminoethylmethacrylate) reacted with dimethyl sulfate to convert at least some of the tertiary amine groups to quaternary ammonium groups
poly(methyldiallylamine) reacted with epichlorohydrin to convert at least some of the tertiary amine groups to quaternary ammonium groups.

The following are typical examples of polymers in (3) above:

(A) Copolymers of acrylamide or substituted acrylamides and acrylate or methacrylate alkyl esters containing quaternary ammonium groups particularly those of 2–4 carbon atoms in the alkylene group, e.g. copolymers of acrylamide and $\beta$-methacryloyloxyethyldimethylethylammonium chloride
N-isopropylacrylamide and acryloyloxyethyltrimethylammonium methyl sulfate
methacrylamide and $\beta$-methacrylyloxyethyltrimethylammonium methyl sulfate
acrylamide and $\beta$-methacryloyloxyethyldiethylmethylammonium methyl sulfate.

(B) Copolymers of acrylamide or substituted acrylamides and a vinyl quaternary pyridinium salt wherein the pyridinium ring contains 0–2 alkyl substituents of 1 or 2 carbon atoms attached to carbon atoms in the pyridinium ring, e.g. copolymers of acrylamide and 1,2-dimethyl-5-vinylpyridinium methyl sulfate
methacrylamide and 1-benzyl-2-vinylpyridinium chloride.

(C) Copolymers of acrylamide or substituted acrylamides and quaternary dialkyldiallylammonium salts, e.g. copolymers of acrylamide and dimethyldiallylammonium chloride.

(D) Copolymers of acrylamide or substituted acrylamides and ethyl vinyl ethers having quaternary ammonium groups in the beta position on the ethyl group, e.g. copolymers of acrylamide and 2-ethyltrimethylammonium methyl sulfate vinyl ether.

(E) Copolymers of esters of acrylic acid or substituted acrylic acids and vinyl monomers containing quaternary ammonium groups, e.g. copolymers of methyl methacrylate and $\beta$-methacryloyloxyethyldimethylammonium chloride
butyl acrylate and $\beta$-methacryloyloxytrimethylammonium methyl sulfate
methyl methacrylate and 1,2-dimethyl-5-vinylpyridinium methyl sulfate
methyl methacrylate and benzylmethyldiallyammonium chloride
butyl acrylate and 2-ethyldiethylbenzylammonium chloride.

The following are typical examples of polymers in (4) above:

(A) Terpolymers of acrylamide or substituted acrylamides, vinyl monomers containing tertiary amine groups, and vinyl monomers containing quaternary ammonium groups, e.g. terpolymers of acrylamide, $\beta$-acryloyloxyethyldimethylamine, and $\beta$-acryloyloxyethyltrimethylammonium methyl sulfate
methacrylamide and $\beta$-methacryloyloxyethyldimethylamine copolymer reacted with dimethyl sulfate to convert at least some of the tertiary amine groups to quaternary ammonium groups.

(B) Terpolymers of esters of acrylic acid or substituted acrylic acids, vinyl monomers containing tertiary amine groups and vinyl monomers containing quaternary ammonium groups, e.g. terpolymers of methyl methacrylate, β-acryloyloxyethyldimethylamine, and β-acryloyloxyethyltrimethylammonium methyl sulfate ethyl acrylate, 2-methyl-5-vinylpyridine, and 1,2-dimethyl-5-vinylpyridinium chloride.

The following are typical examples of polymers in (5) above:

(A) Homopolymers of acrylic acid or methacrylic acid or water soluble salts of each, e.g. poly(acrylic acid); poly(ammonium acrylate); poly(sodium methacrylate).

(B) Homopolymers of acrylate alkyl esters or methacrylate alkyl esters containing sulfonic acid groups or water soluble salts of each, particularly those of 2–4 carbon atoms in the alkylene group, e.g. poly(sodium sulfopropylacrylate); poly(ammonium sulfoethylmethacrylate); poly(acryloyloxypropylsulfonic acid).

(C) Homopolymers of vinyl sulfonic acid or water soluble salts thereof.

(D) Homopolymers of styrene sulfonic acid or water soluble salts thereof.

The following are typical examples of polymers in (6) above:

(A) Copolymers of acrylamide or substituted acrylamides and acrylic acid or methacrylic acid or water soluble salts of each, e.g. copolymers of acrylamide and sodium acrylate; acrylamide and potassium acrylate; methacrylamide and methacrylic acid.

(B) Copolymers of acrylamide or substituted acrylamides and vinyl sulfonic acid or styrene sulfonic acid or water soluble salts of each, e.g. copolymers of acrylamide and vinyl sulfonic acid; methacrylamide and sodium styrene sulfonate.

(C) Copolymers of acrylamide or methacrylamide and acrylate alkyl esters or methacrylate alkyl esters containing sulfonic acid groups or water soluble salts of each, e.g. copolymers of acrylamide and sodium sulfopropylmethacrylate; methacrylamide and ammonium sulfoethylacrylate.

Preferred high molecular weight water soluble cationic and anionic vinyl addition polymers applicable herein within the foregoing polymer definition include homopolymers and copolymers of trialkylaminoalkyl acrylate or methacrylate salts and acrylic and methacrylic acids and their water soluble salts. Specific examples include poly(β-acryloyloxyethyltrimethylammonium methyl sulfate),
poly(β-methacryloyloxyethyltrimethylammonium methyl sulfate),
poly(β-acryloyloxyethyldiethylmethylammonium methyl sulfate),
poly(β-methacryloyloxyethyldiethylmethylammonium methyl sulfate),
poly(acrylic acid),
poly(sodium acrylate),
poly(methacrylic acid),
poly(sodium methacrylate), copolymer of acrylamide and β-acryloyloxyethyltrimethylammonium methyl sulfate, copolymer of acrylamide and β-methacryloyloxyethyltrimethylammonium methyl sulfate, copolymer of methyl methacrylate and β-acryloyloxyethyltrimethylammonium methyl sulfate, copolymer of methyl methacrylate and β-methacryloyloxyethyltrimethylammonium methyl sulfate, copolymer of acrylic acid and acrylamide, copolymer of methacrylic acid and methacrylamide.

Polymers applicable herein containing acrylamide may contain up to about 95 weight percent thereof of acrylamide, those containing up to about 50%–90% of acrylamide being preferred. Substantially the same applies to acrylamide substituted on the alpha carbon atom or on the nitrogen atom. For instance, with acrylamide and β-methacryloyloxyethyltrimethylammonium methyl sulfate or acrylic acid (or its water soluble salts) copolymers they may be by weight thereof about 95%–20% acrylamide and 5%–8% β - methacryloyloxyethyltrimethylammonium methyl sulfate or acrylic acid, preferably 90%–50% acrylamide and 10–50% β-methacryloyloxyethyltrimethylammonium methyl sulfate or acrylic acid, 90%–60% acrylamide and 10%–40% β-methacryloyloxyethyltrimethylammonium methyl sulfate or acrylic acid being specifically preferred.

Polymers applicable herein containing methyl acrylate or methyl methacrylate may contain up to about 50 weight percent thereof of methyl methacrylate or methyl acrylate, those containing 5%–30% being preferred. For instance, with methyl methacrylate and β-methacryloyloxyethyltrimethylammonium methyl sulfate copolymers they may be by weight thereof 50%–5% methyl methacrylate and 50%–95% β-methacryloyloxyethyltrimethylammonium methyl sulfate, preferably 30%–5% methyl methacrylate and 70%–95% β-methacryloyloxyethyltrimethylammonium methyl sulfate.

Water soluble salts referred to herein include e.g. the sodium, potassium, and ammonium salts.

Regarding the high molecular weight water soluble vinyl addition polymers applicable in the present invention, any suitable quaternizing agent of the many that are well known in the art can be used and any extent of quaternization is applicable. Those suitable include for instance the lower alkyl esters of mineral acids such as e.g. the halides, sulfates and phosphates, substituted alkyl halides, and so on. Illustrative of the compounds which may be used are dimethyl and diethyl sulfate, methyl chloride, methyl iodide, methyl bromide, ethyl chloride, ethyl bromide, propyl bromide, 1,3 - dichloropropanol-2, 1-chloroglycerol, and so on. Examples of other materials which may be used are benzyl chloride, methyl p-toluene sulfonate, allyl chloride, ethylene bromohydrin, epichlorohydrin.

This invention is not applicable to nonionic water soluble polymers including e.g. poly(ethylene oxide), poly(ethylenimine), hydroxyethyl cellulose, hydroxypropyl cellulose. In the first place there is no serious problems as described herein with nonionic polymers nor does the application of this invention thereto give the viscosity reduction as it does with cationic and anionic vinyl addition polymers.

Unexpectedly it has been found according to this invention that the water soluble condensation polymers hereof, in combination with the water soluble cationic and anionic vinyl addition polymers hereof, are particularly effective in producing the disclosed benefits of this invention. These condensation polymers are (1) polyamides which are substituted along their polymer chains with secondary amine groups, tertiary amine groups, quaternary ammonium groups, or any mixture of these groups, or (2) polyureylenes which are substituted along their polymer chains with tertiary amine groups, quarternary ammonium groups, or any mixture of these groups. Usually the minimum degree of substitution is about one amine group or one quaternary ammonium group for each two amide groups or for each two ureylene groups in the polymer chain. The maximum degree of substitution is not critical in this invention but usually will be no more than about four amine groups or about four quaternary ammonium groups for each two amide groups or for each two ureylene groups in the polymer chain.

Water soluble condensation polymers applicable herein include:

(7) Polyamides containing secondary or tertiary amine groups obtained by reacting a polyalkylene polyamine having two primary amine groups and at least one secondary or tertiary amine group with a $C_3$–$C_8$ saturated aliphatic dicarboxylic acid.

(8) Polyamides containing tertiary amine or quaternary ammonium groups obtained by reacting a polyalkylene polyamine having two primary amine groups and at least one secondary amine group with a $C_3$–$C_8$ saturated aliphatic dicarboxylic acid, reacting the resulting polyamide either (a) with an alkylating agent to convert at least some of the secondary amine groups to tertiary amine groups, or (b) with an alkylating agent to convert at least some of the secondary amine groups to quaternary ammonium groups, or (c) with epichlorohydrin to convert at least some of the secondary amine groups to quaternary ammonium groups including cyclic structures with or without attendant joining of several of the linear polymer chain units, or (d) with an alkylating agent and epichlorohydrin to convert at least some of the secondary amine groups to quaternary ammonium groups with or without attendant joining of several of the linear polymer chain units.

(9) Polyamides containing quaternary ammonium groups obtained by reacting a polyalkylene polyamine having two primary amine groups and at least one tertiary amine group with a $C_3$–$C_8$ saturated aliphatic dicarboxylic acid, reacting the resulting polyamide with (a) an alkylating agent to convert at least 5% of the tertiary amine groups to quartenary ammonium groups, or (b) with epichlorohydrin to convert at least some of the tertiary amine groups to quaternary ammonium groups with or without attendant joining of several of the linear polymer chain units.

(10) Polyureylenes containing tertiary amine groups obtained by reacting a polyalkylene polyamine having two primary amine groups and at least one tertiary amine group with urea.

(11) Polyureylenes containing quaternary ammonium groups obtained by reacting a polyalkylene polyamine having two primary amine groups and at least one tertiary amine group with urea, reacting the resulting polyureylene either (a) with an alkylating agent to convert at least some of the tertiary amine groups to quaternary ammonium groups or (b) with epichlorohydrin to convert at least some of the tertiary amine groups to quaternary ammonium groups with or without attendant joining of several of the linear polymer chain units.

The following are typical examples of the condensation polymers in (7) above:

(A) Polyamides containing secondary amine groups obtained by reacting diethylenetriamine, triethylenetetramine or tetraethylenepentamine with $C_3$–$C_8$ dicarboxylic acids.

(B) Polyamides containing tertiary amine groups obtained by reacting N,N-bis(3-aminopropyl) methyl-, ethyl-, or propylamines, or N,N-bis(2-aminoethyl) methyl-, ethyl-, or propylamines with $C_3$–$C_8$ dicarboxylic acids.

Preferred condensation polymers in (7) above include e.g. those prepared by reacting adipic acid with diethylenetriamine or methyl-bis-aminopropylamine.

The following are typical examples of the condensation polymers in (8) above:

(A) Polyamides containing secondary amine groups alkylated with formaldehyde and formic acid.

(B) Polyamides containing secondary amine groups reacted with acrylamide whereby at least some of the secondary amine groups in the condensation polymer are converted to >N—$CH_2$—$CH_2$—$CONH_2$ groups. These polymers containing tertiary amine groups may be increased in molecular weight by reaction with difunctional amide-reactive agents such as glyoxal if desired.

(C) Polyamides containing secondary amine groups alkylated to convert at least some of the secondary amine groups to a mixture of tertiary amine and quaternary ammonium groups with $C_1$–$C_4$ alkyl substituents.

(D) Polyamides containing secondary amine groups reacted with epichlorohydrin to convert at least some of the secondary amine groups to tertiary amine groups and quaternary ammonium groups, including cyclic structures. Cyclic structures are groups in which one epichlorohydrin reacts with a secondary amine group to convert it to an ammonium salt group, a four-membered ring being formed.

(E) Polyamides containing secondary amine groups alkylated with formaldehyde and formic acid and reacted with epichlorohydrin to convert at least some of the secondary amine groups to quaternary ammonium groups.

Preferred condensation polymers in (8) above include e.g. those obtained by reacting adipic acid with diethylenetriamine, subsequently alkylating with formaldehyde and formic acid, or reacting with acrylamide, or reacting with epichlorohydrin (or the epichlorohydrin reaction step can be carried out in addition to the alkylation step).

The following are typical examples of the condensation polymers in (9) above:

(A) Polyamides containing tertiary amine groups reacted with alkylating agents to convert at least some of the tertiary amine groups to quaternary ammonium groups with $C_1$–$C_4$ alkyl substituents.

(B) Polyamides containing tertiary amine groups reacted with epichlorohydrin to convert at least some of the tertiary amine groups to quaternary ammonium groups.

Preferred condensation polymers in (9) above include e.g. those prepared by reacting adipic acid with diethylenetriamine and subsequently reacted with dimethylsulfate or epichlorohydrin.

The following are typical examples of the condensation polymers in (10) above:

(A) Polyureylenes obtained by reacting N,N-bis(3-aminopropyl) methyl-, ethyl-, or propylamines or N,N-bis-(2-aminoethyl) methyl-, ethyl-, or propylamines with urea.

Preferred condensation polymers in (10) above include e.g. those obtained by reacting N,N-bis(3-aminopropyl) methylamine with urea.

The following are typical examples of the condensation polymers in (11) above:

(A) Polyureylenes containing tertiary amine groups reacted with alkylating agents to convert at least some of the tertiary amine groups to quaternary ammonium groups.

(B) Polyureylenes containing tertiary amine groups reacted with epichlorohydrin to convert at least some of the tertiary amine groups to quaternary ammonium groups.

Preferred condensation polymers in (11) above include e.g. those obtained by reacting N,N-bis(3-aminopropyl) methylamine with urea, and subsequently reacting with dimethylsulfate or epichlorohydrin.

With reference to the condensation polymers above, in (7)–(9) the mole ratio of polyalkylene polyamine to dicarboxylic acid is about 0.8/1–1.4/1 (preferably about 1/1) and in (10) and (11) the mole ratio of polyalkylene polyamine to urea is about 0.7/1–1.5/1 (preferably about 1/1).

Typical examples of water soluble condensation polymers applicable herein include those of U.S. Pats. 2,926,154, 3,215,654, 3,240,664 and 3,311,594.

In the reaction of epichlorohydrin with polyamides or polyureylenes containing secondary or tertiary amine groups these materials may react with amine groups on two polymer chains to join them and thus increase the molecular weight of the condensation polymer. The tendency toward this chain joining is suppressed by using relatively high ratios of epichlorohydrin to polyamide or polyureylene and high dilution with water during the reaction.

In selecting useful combinations of high molecular weight water soluble vinyl addition polymers and water soluble condensation polymers, it is obviously necessary to avoid combinations and conditions under which chemical reaction occurs to form insoluble complexes. For example polymers containing cationic groups may react with polymers containing anionic groups to form complexes which are water insoluble. In this regard it should be noted that the polyamides which contain secondary or tertiary amine groups under acidic conditions will form salts, the amino groups being converted to ammonium cations. Likewise the polyamides, the amine groups of which have been converted to quaternary ammonium groups under any pH conditions, will contain cationic groups. The vinyl addition polymers containing sulfonic acid groups will under any practical pH conditions contain sulfonate anions. The vinyl addition polymers containing carboxyl groups, under all but highly acidic conditions, contain carboxylate anions. The secondary and tertiary amine groups are, however, essentially nonionic at high pH conditions (about pH 10 and above) and the ionization of carboxyl groups is avoided at low pH conditions (about pH 3 and below). Based on this information, and experimental observation, it is known that (1) vinyl polymers containing sulfonate groups cannot be used in combination with condensation polymers containing quaternary ammonium groups under any conditions, and can be used in combination with condensation polymers containing secondary or tertiary amine groups only in water solutions having a pH of about 10 or above, and (2) vinyl polymers containing carboxyl groups can be used in combination with condensation polymers containing quaternary ammonium groups only in water solutions having a pH of about 3 or below, and in combination with condensation polymers containing secondary or tertiary amine groups only in water solutions having pH values of either about 3 and below or about 10 and above. There is no compatibility problem with combinations of high molecular weight water soluble cationic vinyl addition polymers and water soluble condensation polymers containing secondary or tertiary amine groups or quaternary ammonium groups, and these combinations are preferred in this invention.

It will be readily apparent to the artisan from reading this application that one may use two or more of the vinyl addition polymers together with two or more of the condensation polymers hereof within the spirit and scope of this invention.

As is well known there is no method which is completely reliable for accurately measuring the molecular weight of a polymer, i.e. the average molecular weight. However, the most frequently employed and acceptable methods use reduced specific viscosity (RSV) measurements. Brookfield viscosity measurements are a convenient means for determining molecular weight ranges.

The high molecular weight water soluble cationic and anionic vinyl addition polymers applicable herein are characterized by 1% aqueous solution viscosities of at least about 50 cps. as measured by a standard Brookfield Synchro-Lectric LVF viscometer at 30 r.p.m. and 25° C. Said polymers are also characterized by a reduced specific viscosity (RSV) of at least about 4 (usually about 5-50) measured at 25° C. on 0.1% solutions of polymer in 0.1 M aqueous KCl. The vinyl addition polymers applicable herein have molecular weights in the range of about 250,000 to several million, more often about 1,000,000 to 20,000,000.

The formulations hereof may contain concentrations of the vinyl addition polymers of about 2–35 parts per 100 parts water by weight, concentrations of the condensation polymers of about 1–100 (usually about 2–100) parts per 100 parts water by weight, and total solids of about 4–135 (usually about 6–135) parts per 100 parts water by weight. Of course the particular concentration used will depend on the end-use applications intended for the formulations as well as the viscosities of the polymers employed. Although concentrations outside these ranges can be used under certain circumstances, usually there is no need for it. Regarding the vinyl addition polymers, at concentrations lower than about two parts per 100 parts water there usually is not sufficient need for the present invention to justify its use and at concentrations above about 35 parts per 100 parts water usually the viscosity it so high an uneconomical amount of condensation polymer is required to suppress the viscosity to the desired level. Regarding the condensation polymers, at concentrations below about one part per 100 parts water in most cases the viscosity will not be suppressed to the desired level and at concentrations above about 100 parts per 100 parts water the cost is apt to be greater than can be justified.

The high molecular weight water soluble cationic and anionic vinyl addition polymers and the water soluble condensation polymers hereof and processes of making are all known, and the present invention does not add anything to these per se. After the artisan knows the basic concept of this invention, he will have no difficulty in selecting the polymers desired either from the many specifically disclosed herein or from the many others not specifically but generically disclosed herein. Also there are a number of well known methods disclosed in the prior art of preparing these polymers.

Epichlorohydrin and 1,3-dichloropropanol-2 are interchangeable within the scope of this invention, but epichlorohydrin is usually preferred.

The formulations of the present invention have many uses including e.g. flocculating agents and corrosion inhibitors. Both the vinyl addition polymers and the condensation polymers hereof have many well known uses and usually both are useful for the same application. In fact, applicants know of no use for one type polymer wherein the presence of the other type polymer adversely affects such use. One such use (namely flocculating agent) for the formulations of this invention is given in the following example.

In this example the flocculating agent was diluted with water to a 0.1% concentration and added to each of several 100-ml. portions in glass-stoppered graduated cylinders of a 5% kaolin clay aqueous slurry. The cylinders were then inverted 10 times to insure adequate mixing after which they were allowed to stand. Ml of supernatant formed during standing was measured. Further details appear in Table 5 hereinafter.

TABLE 5

Use of Vinyl Addition Polymer—Condensation Polymer Mixture As Flocculating Agent

| Flocculating agent | | Ml supernatant after standing for— | | | | |
| --- | --- | --- | --- | --- | --- | --- |
| Name | Amt.[1] | 0.5 min. | 1 min. | 3 min. | 5 min. | 10 min. |
| None | None | 1 | 1 | 2 | 4 | 30 |
| Vinyl addition polymer—condensation polymer mixture of Ex. 1, Table 1 | 25 | 2 | 2 | 7 | 19 | 48 |
| Do | 50 | 3 | 9 | 47 | 64 | 77 |
| Do | 100 | 14 | 40 | 66 | 71 | 77 |
| Do | 500 | 30 | 55 | 69 | 74 | 78 |
| Do | 1,000 | 61 | 71 | 77 | 79 | 80 |

[1] P.p.m dry weight basis by weight of dry solids in kaolin clay slurry, added as a 0.1% aqueous solution.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. An aqueous formulation which is stable and readily dilutable with water, consisting essentially of water, 2 to 35 parts per 100 parts water of a water-soluble cationic vinyl addition polymer having an RSV of at least about 4 measured at 25° C. on a 0.1% solution thereof in 0.1% aqueous KCl, and 1 to 100 parts per 100 parts water of a solid, resinous, water-soluble condensation polymer, the viscosity of said formulation being substantially less than that of a bicomponent formulation having the same proportions of said vinyl addition polymer and water, said condensation polymer being selected from the following:
   (a) a polyamide containing secondary or tertiary amine groups obtained by reacting a polyalkylene polyamine having two primary amine groups and at least one secondary or tertiary amine group with a $C_3$–$C_8$ saturated aliphatic dicarboxylic acid;
   (b) a polyamide containing tertiary amine groups or quaternary ammonium groups obtained by reacting a polyalkylene polyamine having two primary amine groups and at least one secondary amine group with a $C_3$–$C_8$ saturated aliphatic dicarboxylic acid, reacting the resulting polyamide either (1) with an alkylating agent, or (2) with epichlorohydrin, or (3) with both (1) and (2) either together or separately in any order; and
   (c) a polyamide containing quaternary ammonium groups obtained by reacting a polyalkylene polyamine having two primary amine groups and at least one tertiary amine group with a $C_3$–$C_8$ saturated aliphatic dicarboxylic acid, reacting the resulting polyamide either (1) with an alkylating agent, or (2) with epichlorohydrin, said cationic vinyl addition polymer and said condensation polymer being inert to each other under the pH conditions existing in the formulation.

2. The formulation of claim 1 wherein said vinyl addition polymer is from the following:
   (a) vinyl homopolymers containing quaternary ammonium groups,
   (b) vinyl polymers containing both quaternary ammonium groups and tertiary amine groups,
   (c) copolymers of vinyl monomers containing quaternary ammonium groups and up to about 95% by weight of the total of another vinyl monomer, and
   (d) terpolymers of vinyl monomers containing quaternary ammonium groups and up to about 95% by weight of the total of two other vinyl monomer.

3. The formulation of claim 1 wherein said vinyl addition polymer is a vinyl homopolymer containing quaternary ammonium groups, and wherein said condensation polymer is a polyamide containing quaternary ammonium groups obtained by reacting a polyalkylene polyamine having two primary amine groups and at least one secondary amine group with a $C_3$–$C_8$ saturated aliphatic dicarboxylic acid and then reacting the resulting polyamide with an alkylating agent and epichlorohydrin.

4. The formulation of claim 1 wherein said vinyl addition polymer is a vinyl polymer containing both quaternary ammonium groups and tertiary amine groups, and wherein said condensation polymer is a polyamide containing quaternary ammonium groups obtained by reacting a polyalkylene polyamine having two primary amine groups and at least one secondary amine group with a $C_3$–$C_8$ saturated aliphatic dicarboxylic acid and then reacting the resulting polyamide with an alkylating agent and epichlorohldrin.

5. The formulation of claim 1 wherein said vinyl addition polymer is a copolymer of a vinyl monomer containing quaternary ammonium groups and up to about 95% by weight of the total of another vinyl monomer, and wherein said condensation polymer is a polyamide containing quaternary ammonium groups obtained by reacting a polyalkylene polyamine having two primary amine groups and at least one secondary amine group with a $C_3$–$C_8$ saturated aliphatic dicarboxylic acid and then reacting the resulting polyamide with an alkylating agent and epichlorohydrin.

References Cited

UNITED STATES PATENTS 2,895,786   7/1959   Schlack _____ 260—29.6 NR
3,049,469   8/1962   Davison _____ 260—29.6 NR HAROLD D. ANDERSON, Primary Examiner U.S. Cl. X.R.

210—54; 260—29.4 UA, 849, 857 UA, 859 R